United States Patent [19]
Öllinger et al.

[11] 3,983,325
[45] Sept. 28, 1976

[54] METHOD OF ESTABLISHING SYNCHRONISM BETWEEN TELETYPEWRITER TRANSMITTER AND TELETYPEWRITER RECEIVER

[75] Inventors: Max Öllinger; Wernhard Markwitz, both of Munich, Germany

[73] Assignee: Siemens Aktiengesellschaft, Munich, Germany

[22] Filed: Oct. 31, 1973

[21] Appl. No.: 411,368

[30] Foreign Application Priority Data
Dec. 4, 1972 Germany............................ 2259335

[52] U.S. Cl. ...................... 178/69.5 R; 178/53.1 R; 178/81; 325/42; 340/146.1 D
[51] Int. Cl.[2] ...................... H04L 7/04; H04B 3/10
[58] Field of Search ................ 178/69.5, 79, 81, 50, 178/53, 53.1 R; 340/146.3 Z, 347 P, 146.1 D; 343/179; 325/42, 38 A; 179/15 BS

[56] References Cited
UNITED STATES PATENTS

| | | | |
|---|---|---|---|
| 2,956,126 | 10/1960 | Jipp | 178/53 |
| 3,546,592 | 12/1970 | Mayo | 340/146.1 D |
| 3,562,710 | 2/1971 | Halleck | 340/146.1 D |
| 3,587,043 | 6/1971 | Mengani | 178/69.5 R |
| 3,651,263 | 3/1972 | Lindback et al. | 178/69.5 R |
| 3,702,900 | 11/1972 | Stürzinger | 179/15 BS |
| 3,775,688 | 11/1973 | Hinoshita et al. | 325/38 A |

*Primary Examiner*—Malcolm A. Morrison
*Assistant Examiner*—Errol A. Krass
*Attorney, Agent, or Firm*—Schuyler, Birch, Swindler, McKie & Beckett

[57] ABSTRACT

A method is described for establishing character frame synchronism between a teletypewriter transmitter and receiver wherein the direction of transmission is unidirectional. The transmitter sends character signals identifying characters of the alphabet or the like and operating condition signals corresponding to the operation condition of the transmitter. The operating condition signals are processed in a code converter which allocates code words to them permitting recognition of the character frame. The code words are transmitted to the receiver wherein a clock signal is derived by means of a character frame discriminator. The code words are reconverted in the receiver in order to cancel the code conversion which took place at the transmitter.

3 Claims, 6 Drawing Figures

METHOD OF ESTABLISHING SYNCHRONISM BETWEEN TELETYPEWRITER TRANSMITTER AND TELETYPEWRITER RECEIVER

BACKGROUND OF THE INVENTION

This invention relates to a method for establishing character frame synchronism between a teletypewriter transmitter and a teletypewriter receiver, wherein the teletypewriter transmission takes place unidirectionally from the transmitter to the receiver and wherein the transmitter sends character signals, actuating signals and operating condition signals. The character signals produced at the transmitter identify the characters, for example, the letters of the alphabet, to be reproduced at the receiver. Each character signal identifying an individual character begins with a start signal, is followed by several information signal elements and ends with a stop signal. The actuating signals are used, for example, for initiating character return, line feed and provide space and line feed information. These actuating signals, likewise, begin with a start signal element and end with a stop signal element. Both the character signals and the actuating signals are binary code signals. The latter are to be contrasted with the analog signals used as operating condition signals; operating condition signals identify two operating conditions of the transmitter. Primarily these signals are used as a continuous start signal and a continuous stop signal. Since these are analog signals, they can be transmitted for any length of time and are not specifically characterized by a particular arrangement of start signal elements and stop signal elements. Because of the start signal elements and stop signal elements of the character signals and the actuating signals, each containing a predetermined constant number of bits and lasting for a specified period of time, the correct character frame can be determined at the receiver. Due to the lack of start signals and stop signals as parts of the operating condition signals, it then becomes difficult to ascertain the correct character frame at the receiver.

It is, therefore, an object of the invention to provide a method for determining the correct character frame during the period of time when operating condition signals are being transmitted and to provide a method for establishing proper character frame synchronism of clock actuated devices in transmitters and receivers of systems of the type described hereinabove.

SUMMARY OF THE INVENTION

In accordance with the invention, the foregoing and other objects are achieved in that the operating-condition signals are supplied to a code converter at the transmitter, which code converter allocates code words to the operating-condition signals causing the character frame to be recognized. The code words are transmitted over the telecommunication circuit and a clock signal is derived by means of a character frame discriminator. This clock signal ensures the synchronism of the transmitter and the receiver on a character frame basis, the transmitted code words being routed to the receiver over a code converter at the receiving end which cancels the code conversion produced at the transmitting end.

The method according to the invention is distinguished by the fact that synchronism is maintained at all times even if the operating-condition signals, for example, continuous start signal and continuous stop signal, are transmitted. A particular advantage of the method according to the invention is that this synchronism is maintained in the intervals during the transmission of intelligence.

To establish the synchronism of transmitter and receiver rapidly, it is convenient to allocate to the signal elements or the signals affecting the operation of the receiver (actuating signals) by means of a code converter, code words which differ from the code words assigned to the operating-condition signals, even if the synchronism of transmitter and receiver is not established.

If the signal elements and the actuating signals are transmitted by words of a binary code, it is convenient that the first bit of the signal-element code words and of the actuating-signal code words be identical to or have the opposite value of the bit of the start signal, that the further bits of the signal-element code words and of the actuating-signal code words be identical to or have the opposite value of the bits of individual words of the binary code, and that the last bit of the signal-element code words and of the actuating-signal code words identify the parity of the preceding bits. If the operating-condition signals are, likewise, transmitted by words of a binary code, it is convenient that the first bit of the code words have the opposite value of the first bit of the signal-element code words and actuating-signal code words, that further bits of the code word be equal to or have the opposite value of the bits of individual words of the binary code, and that the last bit of the code words identify the false polarity of the preceding bits.

If the synchronism of the transmitter is to be established with a minimum technical effort, it is convenient under the requisite conditions set forth above to insert the teletypewriter signal being transmitted into a shift register. In so doing, the switching stages of the shift register are placed in a predetermined initial state after the intelligence of the teletypewriter signals has been retransmitted. The stages of the shift register are connected such that during the time they are in the specified state they transmit a code word corresponding to the operating-state signal of the continuous stop signal (DSP). The shift register is thus employed as a code converter as far as the continuous stop signal is concerned.

BRIEF DESCRIPTION OF THE DRAWINGS

The principles of the invention will be more readily understood by reference to the description of a preferred embodiment given hereinbelow in conjunction with the accompanying six-figure drawings, wherein.

DETAILED DESCRIPTION OF THE DRAWINGS

Figure 1:
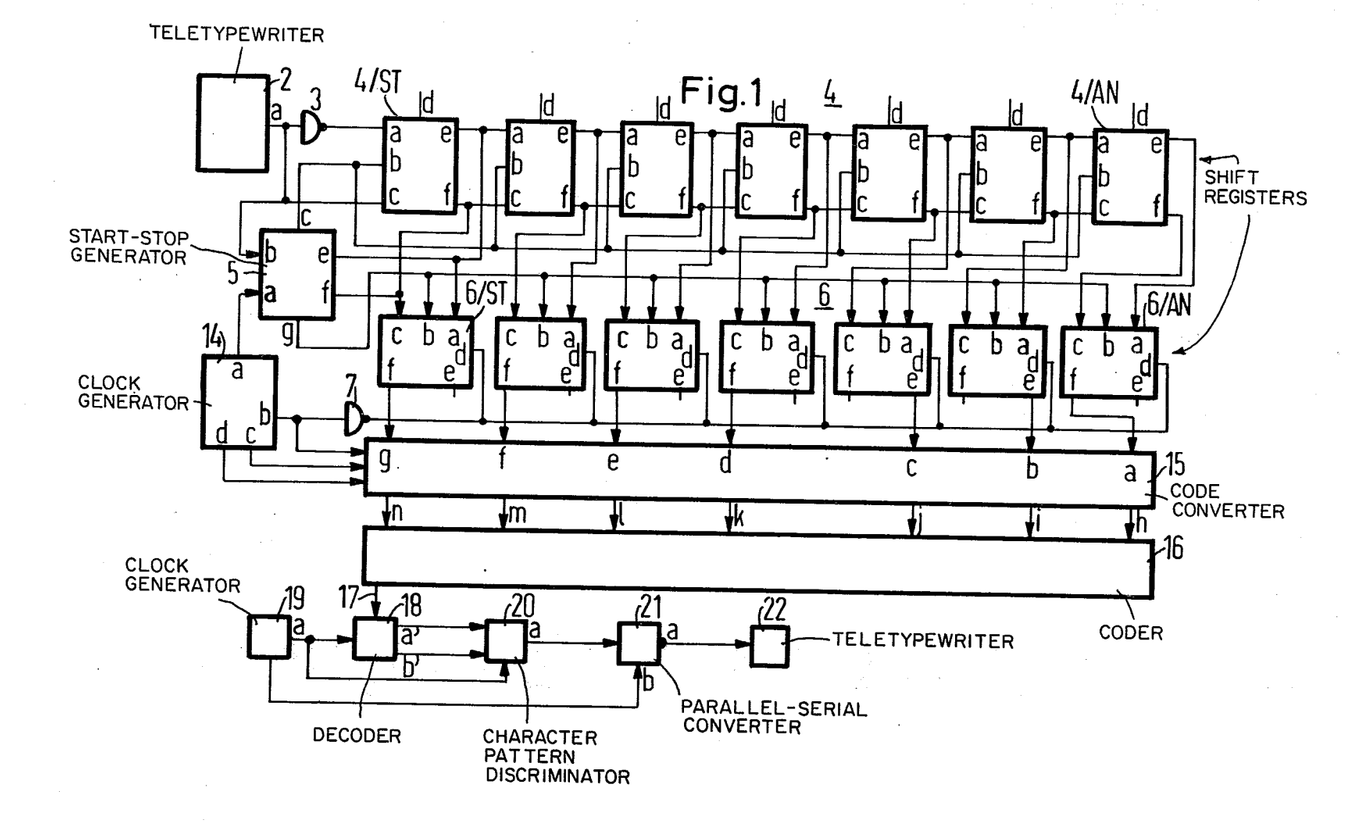
FIG. 1 is a schematic diagram of a system for transmitting teletypewriter signals in accordance with the invention, FIG. 2 are time-waveform diagrams of signals generated by means of the system depicted in FIG. 1.

The teletypewriter transmission system illustrated in FIG. 1 comprises, at the transmitter a teletypewriter 2, NO gates 3, 7 shift register 4, start-stop generator 5, shift register 6, clock generator 14, code converter 15, and coder 16. Furthermore, the teletypewriter system comprises a transmission circuit 17 and in the receiver a decoder 18, a clock generator 19, character pattern discriminator 20, parallel to serial converter 21 and a teletypewriter 22. This is a unidirectional teletypewriter transmission system wherein the signals are transmitted outgoing from the teletypewriter 2 to the teletypewriter 22, whereby the character synchronism of the devices arranged at the transmitting and receiving ends is maintained without being affected by the devices disposed at the transmitting end.

Figure 2:
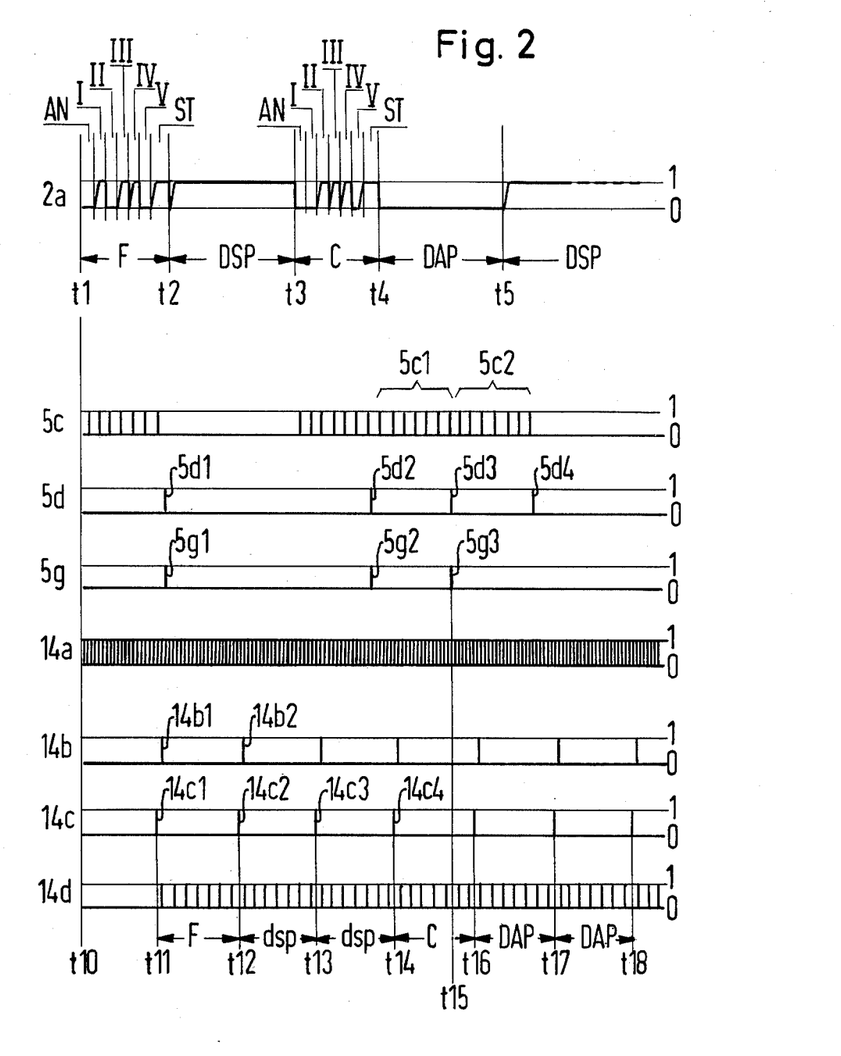

FIG. 2 shows signals occurring during the operation of the teletypewriter transmission system depicted in FIG. 1. The signals are labeled with the same reference characters as the outputs from which they are provided. By way of example, the signal provided from output 2a of the teletypewriter 2 is labeled 2a. The signal 2a is coded in accordance with the telegraph code CCITT No. 2, according to which the words corresponding to the characters consist each of a start signal AN, five information signals I, II, III, IV, V and one stop signal ST. The stop signal ST can last as long as the individual information signals I to V, but it can also last 50 percent longer than the individual information signals.

The signal 2a illustrated in FIG. 2, for example, shows the bits of the character F. The start signals AN, the information signals I to V and the stop signals are represented by binary signals, the values of which are called value 0 or value 1. Signals identifying a value 0 or a value 1 shall hereinafter be referred to as signal 0 or signal 1. For example, the character F starts at the instant $t1$ with the start signal AN and ends at the instant $t2$ with the stop signal ST. Therebetween there are five information signals having the binary values 1, 0, 1, 1, 0. The continuous stop signal DSP is transmitted from the instant $t2$ to the instant $t3$ by a continuous sequence of the values 1. The character C is sent from the instant $t3$ to the instant $t4$ starting with the start signal AN and ending with the stop signal ST. Therebetween are the information signals I to V with the binary values 0, 1, 1, 1, 0. The continuous start signal DAP is sent from the instant $t4$ to the instant $t5$ and consists of a continuous sequence of the values 0.

The signal sent by the teletypewriter 2 depicted in FIG. 1 is routed to the shift register 4 which, for example, comprises a total of seven bistable switching stages (flip-flop). The two stable states of these switching stages and all the other such switching stages mentioned hereinabove are termed the zero state and the one state. The switching stages have inputs $a$, $b$, $c$, $d$, and outputs $e$ and $f$. During their zero state they transmit a signal 1 over the outputs $e$ and a signal 0 over the outputs $f$. During their one state they transmit a signal 0 over their outputs $e$, and a signal 1 over their outputs $f$. A transition from the zero state to the one state takes place when a signal 0 is routed to the input $d$. In addition, a transition from the zero state to the one state takes place when signals 1 are applied to the inputs $c$ and $d$ and a transition takes place at the input $b$ from a signal 1 to a signal 0. The bistable stages are restored from their one state to their zero state when signals 1 are applied to the inputs $a$ and $d$ and when at the input $b$ a transistion takes place from the signal 1 to the signal 0.

The signal transmitted by the teletypewriter 2 is entered serially into the shift register 4. In so doing, the output 2a is linked directly to the input $c$ of the switching stage 4/ST and to the input $a$ of switching stage 4/ST over the NO gate 3.

The line-to-store transfer takes place by means of clock generator 14 and start-stop generator 5. The clock generator 14 transmits a signal 14a, depicted in FIG. 2, over output 14a; the pulse repetition rate of signal 14a is substantially higher than that of the individual bits of signal 2a. For example, the pulse repetition rate of the individual pulses of the signal 14a can be a thousand times higher than the recurrence rate of the individual bits of the signal 2a.

The signal 2a is routed to the start-stop generator 5 over its input $b$, with the start-stop generator 5 verifying if a signal 0 corresponding to a start signal AN is present. If so, the start-stop generator 5 sends seven pulses of a signal 5c, which lie approximately midway between the start signal AN and the individual information bits I to V (see FIG. 2). These seven pulses of the signal 5c serve as shift pulses and are routed to the inputs $b$ of the switching stages of the shift register 4. After the seven pulses, the start-stop generator 5 transmits the signal 5d1.

Thus, the line-to-store transfer of the individual signal elements of the character F starts with the start signal which are then followed by the five information signals I to V and the stop signal ST. Finally, the start signal AN is entered into the stage 4/AN. In the five following switching stages the five information signals I to V are stored progressively from right to left and the stop signal ST is stored in the multivibrator 4/ST.

After the instant $t2$, the start-stop generator 5 initially obtains no signal 0, so that it transmits no further pulses 5c until the instant $t3$. The bits of the character F stored in the shift register continue to be stored, since no further shift pulses of the signal 5c are supplied.

From the pulse 5d1 is derived the pulse 5g1 which is routed to the inputs b of the shift register 6, so that the information stored in the shift register 4 is accepted into the shift register 6. Although the bistable switching stages of the shift register 6 are differently connected to the outputs $e$ and $f$ of the stages of the shift register 4, the individual bits of the character F are transmitted to the inputs $a$, $b$, $c$, $d$, $e$, $f$, $g$ of the code converter 15 after the exchange of storage contents. In so doing, the switching stage 6/AN remains in its zero state, in which condition it transmits a signal 0 over the output $f$. However, the stage 6/ST is shifted to its one state by the stop signal ST, in which condition it transmits a signal 1 over the output $f$.

TABLE 1

| | Inputs | | | | | | | Outputs | | | | | |
|---|---|---|---|---|---|---|---|---|---|---|---|---|---|
| | a | b | c | d | e | f | g | h | i | j | k | l | m | n |
| A | 0 | 1 | 1 | 0 | 0 | 0 | 1 | 0 | 1 | 1 | 0 | 0 | 0 | 0 |
| B | 0 | 1 | 0 | 0 | 1 | 1 | 1 | 0 | 1 | 0 | 0 | 1 | 1 | 1 |

TABLE 1-continued

| | Inputs | | | | | | | Outputs | | | | | |
|---|---|---|---|---|---|---|---|---|---|---|---|---|---|
| | a | b | c | d | e | f | g | h | i | j | k | l | m | n |
| C | 0 | 0 | 1 | 1 | 1 | 0 | 1 | 0 | 0 | 1 | 1 | 1 | 0 | 1 |
| D | 0 | 1 | 0 | 0 | 1 | 0 | 1 | 0 | 1 | 0 | 0 | 1 | 0 | 0 |
| E | 0 | 1 | 0 | 0 | 0 | 0 | 1 | 0 | 1 | 0 | 0 | 0 | 0 | 1 |
| F | 0 | 1 | 0 | 1 | 1 | 0 | 1 | 0 | 1 | 0 | 1 | 1 | 0 | 1 |
| G | 0 | 0 | 1 | 0 | 1 | 1 | 1 | 0 | 0 | 1 | 0 | 1 | 1 | 1 |
| H | 0 | 0 | 0 | 1 | 0 | 1 | 1 | 0 | 0 | 0 | 1 | 0 | 1 | 0 |
| I | 0 | 0 | 1 | 1 | 0 | 0 | 1 | 0 | 0 | 1 | 1 | 0 | 0 | 0 |
| J | 0 | 1 | 1 | 0 | 1 | 0 | 1 | 0 | 1 | 1 | 0 | 1 | 0 | 1 |
| K | 0 | 1 | 1 | 1 | 1 | 0 | 1 | 0 | 1 | 1 | 1 | 1 | 0 | 0 |
| L | 0 | 0 | 1 | 0 | 0 | 1 | 1 | 0 | 0 | 1 | 0 | 0 | 1 | 0 |
| M | 0 | 0 | 0 | 1 | 1 | 1 | 1 | 0 | 0 | 0 | 1 | 1 | 1 | 1 |
| N | 0 | 0 | 0 | 1 | 1 | 0 | 1 | 0 | 0 | 0 | 1 | 1 | 0 | 0 |
| O | 0 | 0 | 0 | 0 | 1 | 1 | 1 | 0 | 0 | 0 | 0 | 1 | 1 | 0 |
| P | 0 | 0 | 1 | 1 | 0 | 1 | 1 | 0 | 0 | 1 | 1 | 0 | 1 | 1 |
| Q | 0 | 1 | 1 | 1 | 0 | 1 | 1 | 0 | 1 | 1 | 1 | 0 | 1 | 0 |
| R | 0 | 0 | 1 | 0 | 1 | 0 | 1 | 0 | 0 | 1 | 0 | 1 | 0 | 0 |
| S | 0 | 1 | 0 | 1 | 0 | 0 | 1 | 0 | 1 | 0 | 1 | 0 | 0 | 0 |
| T | 0 | 0 | 0 | 0 | 0 | 1 | 1 | 0 | 0 | 0 | 0 | 0 | 1 | 1 |
| U | 0 | 1 | 1 | 1 | 0 | 0 | 1 | 0 | 1 | 1 | 1 | 0 | 0 | 1 |
| V | 0 | 0 | 1 | 1 | 1 | 1 | 1 | 0 | 0 | 1 | 1 | 1 | 1 | 0 |
| W | 0 | 1 | 1 | 0 | 0 | 1 | 1 | 0 | 1 | 1 | 0 | 0 | 1 | 1 |
| X | 0 | 1 | 0 | 1 | 1 | 1 | 1 | 0 | 1 | 0 | 1 | 1 | 1 | 0 |
| Y | 0 | 1 | 0 | 1 | 0 | 1 | 1 | 0 | 1 | 0 | 1 | 0 | 1 | 1 |
| Z | 0 | 1 | 0 | 0 | 0 | 1 | 1 | 0 | 1 | 0 | 0 | 0 | 1 | 0 |
| WR | 0 | 0 | 0 | 0 | 1 | 0 | 1 | 0 | 0 | 0 | 0 | 1 | 0 | 1 |
| ZL | 0 | 0 | 1 | 0 | 0 | 0 | 1 | 0 | 0 | 1 | 0 | 0 | 0 | 1 |
| BU | 0 | 1 | 1 | 1 | 1 | 1 | 1 | 0 | 1 | 1 | 1 | 1 | 1 | 1 |
| ZI | 0 | 1 | 1 | 0 | 1 | 1 | 1 | 0 | 1 | 1 | 0 | 1 | 1 | 0 |
| ZWR | 0 | 0 | 0 | 1 | 0 | 0 | 1 | 0 | 0 | 0 | 1 | 0 | 0 | 1 |
| VOR | 0 | 0 | 0 | 0 | 0 | 0 | 1 | 1 | 0 | 1 | 0 | 1 | 0 | 0 |
| DAP | 0 | 0 | 0 | 0 | 0 | 0 | 0 | 1 | 0 | 1 | 1 | 0 | 1 | 0 |
| dsp | 1 | 0 | 0 | 1 | 1 | 1 | 1 | 1 | 0 | 0 | 1 | 1 | 1 | 1 |

Table 1 shows the allocation brought about by the code converter 15. In the first row of Table 1 are entered the inputs a to g and the outputs h to n of the code converter 15. In the first column of table 1 are the characters of the alphabet A, B, C, to Z which are to be written with the aid of the teletypewriter shown in FIG. 1. Furthermore, actuating signals are present in the first column of Table 1 which control the receiver section in the teletypewriter 22: WR (carriage return), ZL (line feed), BU (letters), ZI (figures), ZWR (space), VOR (fed information). Moreover, in the first column of Table 1 there are reference characters for operating-condition signals identifying the condition of the teletypewriter 2. They are the signal DAP (continuous start signal) which indicates that the teletypewriter 2 is not ready for transmitting and the signal dsp which is associated with the continuous stop signal DSP identifying the ready-for-transmission condition of the teletypewriter 2.

The bits tabulated under the input a identify, with the exception of the continuous start signal DAP and the code combination dsp, the start signal and are thus zero values. The binary values of the alphabetical characters and of the actuating signals of the receiver under the inputs b, c, d, e, f are the information bits according to the CCITT No. 2 code. The binary values under the input g are all one values, with the exception of the continuous start signal DAP.

With respect to the correlation brought about by the code converter 15, the expressions A to ZWR will first be discussed. In the column tabulated under the output h, zero values are without exception allocated to the expressions A to ZWR and, thus, signals 0 are without exception provided over the output h of the code converter 15. Exactly the same binary values are transmitted one after the other over the outputs i, j, k, l, m as they are routed to the inputs b, c, d, e, f. Over the output n is transmitted a binary value which is dependent upon the parity of the preceding binary values. A signal 0 is transmitted if there is an even number of values 1, and a signal 1 is transmitted over the output n if there is an uneven number of values 1. Thus, in the case of the character F the word 0, 1, 0, 1, 1, 0, 1 is routed to the inputs a, b, c, d, e, f, g of the code converter 15, and the word 0, 1, 0, 1, 1, 0, 1 is transmitted over the outputs h, i, j, k, l, m, n of the code converter 15. Since the word 0, 1, 0, 1, 1, 0 provided over the outputs h to m has an uneven number of values i, a signal 1 is transmitted over the output n.

Several signals, which are supplied by the clock generator 14, are required for operating the code converter 15. The signals 14b, 14c and 14d are shown in FIG. 2. The pulses of the signal 14c appear at the instants t11, t12, t13, t14, t16, t17, t18, t19 and follow one another at regular time intervals independently of the signal 2a. The time interval t2-t1 is slightly greater than the time interval t11-t10. For example, the time interval t2-t1 can be 150 msec and the time interval t11 to t10 can be 145 + 5/6 msec. The bits being applied to the inputs a to g of the code converter 15 are accepted into the code converter 15 with the pulse 14c1. Thus, the individual bits of the character F are now stored in the code converter 15. Shortly thereafter, all switching stages of the shift register 6 are shifted to the one condition with the pulse 14b1, which is routed in negated form as a value zero to the inputs d.

The signal 14d is derived as a function of the signal 14c, the pulses of the signal 14d serving as shift pulses for the output of the bits which are ready at the outputs h to n of the code converter 15. The individual bits of the character F are thus output from the instant t11 to the instant t12. A reconversion is carried out in the coder 16 in accordance with a conventional code, which is not subject matter pertinent to this invention and will thus not be explained in detail herein. The signal is transmitted from the output of the coder 16 over the telecommunication circuit 17 and routed to the decoder 18. The decoder is conventionally constructed in the manner of a convolutional decoder and for this reason will not be described in detail. If the transmission is faultless, the decoder 18 cancels every code conversion caused by the convolutional coder 16.

The clock generator 19 is required for the operation of the decoder 18 over the output 19a. If the transmission is free from defects, a signal is transmitted over the output 18a which is similar to the one routed to the coder 16 at the beginning. In addition, a signal is transmitted over the output 18b that indicates if the characters have properly been transmitted or not.

The instants identifying the start of a character are determined in the character frame discriminator 20. Thus, the instant t11 corresponding to the instant t1 is determined, within the framework of the described example, and a word identifying the character F is transmitted to the code converter 21 over the output 20a. In the interest of simplicity, only a single line is shown from the output 20a to the parallel to serial converter 21, whereas in actuality several lines are provided. The converter 21 causes in conjuction with the character frame discriminator 20 the inverted code conversion as the code converter 15 and the shift register 16. The received word 0, 1, 0, 1, 1, 0, 1 is routed to the teletypewriter 22 over the output of the converter 21 and written thereat as a character F.

Thus far, the transmission of a signal corresponding to the character F has been shown with the aid of FIGS. 1 and 2. Similarly, signals corresponding to the remainder of the alphabet B to Z and signals corresponding to the expressions WR, ZL, BU, ZI, ZWR and VOR are transmitted. It is now assumed that from the instant t2 shown in FIG. 1 until the instant t3 values 1 corresponding to the continuous stop signal DSP are input from the teletypewriter 2. The start-stop generator 5 which, likewise, obtains over the output 2a a signal corresponding to the continuous stop polarity DSP verifies continuously if a start signal AN appears or not. Since no start signal AN appears, the start-stop generator sends no signals from the instant t2 to the instant t3 over the outputs 5c and 5g. The bits of the character F thus continue to be stored in the shift register 4, and the states of the individual switching stages of the shift register 6 are not altered. This means that all switching stages of the shift register 6 continue to remain in the one state in which it has shifted the pulse 14b1. During the existence of the one state the stages of the shift register 6 transmit the code word 100111 which is labeled dsp in Table 1.

If, after the instant t2, an additional character similar to the character F is supplied with the aid of the signal 2a, the individual bits of this character, as described hereinabove, are stored in the shift register 4 and accepted into the shift register 6 with one of the pulses 5d. In the present case, however, it is assumed that after the appearance of the pulse 14b1 the continuous stop signal DSP consisting of a sequence of values 1 is transmitted. By means of the shift register 6, a code conversion has already been carried out prior to the code converter 15 in that the code word dsp 10111 is allocated to the continuous stop signal DSP and routed to the inputs a to g of the code converter 15. As shown in Table 1, the code word dsp is not changed by the code converter 15.

As described hereinabove, the word 1, 0, 0, 1, 1, 1, 1 provided by the outputs h to n of the code converter 15 is processed by means of the coder 16, the decoder 18 and, if the reception is free from defects, routed to the character frame discriminator 20.

The character frame discriminator 20 recognizes by virtue of the word 1, 0, 0, 1, 1, 1, 1, the beginning and end of the character pattern. If the continuous stop signal DSP had been transmitted without employing the shift register 6 and a sequence of values 1 had been supplied by the output of the decoder 18, it would not have been possible to determine the beginning and end of the character pattern. The word 1, 0, 0, 1, 1, 1, 1 is further distinguished by the fact that it cannot be confused with other code words of the CCITT Code No. 2, even if the character pattern is not known.

Table 2 shows this state of affairs in the example of two successive words 1, 0, 0, 1, 1, 1, 1. The correct character frame is identified by the instants t6, t7, t8. If this character frame is not known, the words starting at other instants for locating the character frame and for identifying the word must also be utilized.

TABLE 2

| DSP | 1 | 0 | 0 | 1 | 1 | 1 | 1 | | 1 | 0 | 0 | 1 | 1 | 1 | 1 |
|---|---|---|---|---|---|---|---|---|---|---|---|---|---|---|---|
| | | 0 | 0 | 1 | 1 | 1 | 1 | | 1 | | | | | | |
| | | | 0 | 1 | 1 | 1 | 1 | | 1 | 0 | | | | | |
| | | | | 1 | 1 | 1 | 1 | | 1 | 0 | 0 | | | | |
| | | | | | 1 | 1 | 1 | | 1 | 0 | 0 | 1 | | | |
| | | | | | | 1 | 1 | | 1 | 0 | 0 | 1 | 1 | | |
| | | | | | | | 1 | | 1 | 0 | 0 | 1 | 1 | 1 | |
| | t6 | | | | | | | | t7 | | | | | | t8 |

It is important that none of these words are identical with words having a different meaning. For example, the word 0011111 cannot mean any of the characters A to Z or any of the expressions WR, ZL, BU, ZI and ZDR, because the last bit has a value 1 and no value 0 which it would have to have, because an even number of values 1 precede this last bit. Similarly, the word 0111110 cannot mean any of the above characters and expressions, because the last bit has a value 0 and no value 1 which it would have to have on account of the parity. The other words which all begin with a value 1 cannot for this reason alone means any of the characters A to Z or any of the expressions WR, ZL, BU, ZI and ZDR, because all these characters and expressions begin with a zero value.

After the transmission of the continuous stop signal DSP is completed, it is assumed that from the instant t3 to the instant t4 the start signal AN, the information signals I to V, and the stop signal ST are transmitted, which signals identify the character C. With the aid of the seven pulses of the signal 5c the individual bits of the character C are stored in the same manner as described above with regard to the line-to-store transfer of the character F. Furthermore, the pulse 5g2 is derived with the pulse 5d2 and, thus, the word 0011101 of the character C taken from Table 1 is input to the shift register 6 and accepted into the code converter 15 with the pulse 14c4. From the instant t14 to the instant t16 the code word 0, 0, 1, 1, 1, 0, 1 corresponding to the character C is output over the outputs h to n of the code converter 15 through the pulses of the signal 14d.

Subsequently, this code word 0, 0, 1, 1, 1, 0, 1 is processed by means of the coder 16, decoder 18, the clock generator 19, the character frame discriminator 20 and the parallel serial converter 21 in the same manner as the corresponding code word of the character F and, finally, the character C is written with the teletypewriter 22.

It is now assumed that the continuous start signal DAP is sent until the instant t5. The start-stop generator 5 recognizes the first value 0 of the continuous start signal DAP, interprets the same as a start signal, and hence sends seven pulses 5c1, so that the word 0, 0, 0, 0, 0, 0, 0 is stored in the shift register 4 and the word 0, 0, 0, 0, 0, 0, 0 is likewise transmitted to the code converter 15 over the outputs of the bistable stages of the shift register. As shown in Table 1, the FEC code word 1, 1, 1, 1, 0, 1, 0 is allocated to the CCITT No. 2 code word 0, 0, 0, 0, 0, 0, 0 which is transmitted by the code converter 15 over the outputs h to n.

This code word 1, 1, 1 1, 0, 1, 0 is then processed in the same way as described above through the coder 16, the decoder 18, the clock generator 19 and the character pattern discriminator 20.

The character pattern discriminator 20 can recognize the correct character pattern with the aid of the word 1, 1, 1, 1, 0, 1, 0. Also, this word is distinguished by the fact that even if the correct character pattern is not known, there can be no confusion with other characters and expressions.

During the transmission of the continuous start signal DAP sequence of values 0 can again be obtained after repeated code conversions in the code converter 21 which identify the continuous signal. This sequence of values 0 is at first output from the instant t16 drawn in FIG. 2 with the signal 14d to the instant t17. The seven pulses of the signal 14d output from the instant t16 to the instant t17 correspond to the seven pulses 5c1. Following these seven pulses 5c1 the start-stop generator 5 depicted in FIG. 1 counts five additional seven pulses 5c2 and transmits the pulse 5d4. Since the continuous stop signal is again transmitted at the instant t5, the start-stop generator 5 determines that the seventh signal has a value 1, which it therefore interprets as a stop signal ST.

In order to prevent that the bits stored in the shift register 4 from the instant t15 are interpreted as a code word of the CCITT code No. 2, a test circuit is provided in the start-stop generator 5 which verifies if the bits stored in the shift register 4 from the instant t15 mean a code word or not. By using a signal which is output by said test circuit the pulse 5d4 is caused to be suppressed. Thus, the word 0000000 stored in the shift register 6 is obtained and it is input to the code converter 15 with the next pulse of the signal 14b. Thus, by means of the pulses 14d the code word 1111010 corresponding to the continuous start signal DAP is output from the instant t17 to the instant t18.

The words 1001111, 1111010 and 1010100 entered at the bottom in Table 1 under the outputs -n are distinguished by the fact that their minimum distance is four. It is not absolutely necessary to allocate the word 1001111 to the continuous stop signal DSP, but it could also be assigned to the continuous start signal DAP or to the feed information VOR. Similarly, the word 1111010 could also be allocated to the continuous stop signal DSP or to the feed information VOR.

Aside from the words 1001111, 1111010 and 1010100 there are other words which are all characterized by the fact that they enable an identification of the correlated concepts of the continuous stop signal DSP of the continuous start signal DAP and of the feed information and cannot be confused with any of the characters A to Z or with any of the expressions WR, ZL, BU, ZI, ZWR, even if the character pattern is now known. Table 3 shows 31 words with these characteristics.

TABLE 3

|  | I | II | III | IV | V | VI | VII |  |
|---|---|---|---|---|---|---|---|---|
| 101 | 1 | 1 | 0 | 0 | 0 | 0 | 1 |  |
| 102 | 1 | 0 | 1 | 0 | 0 | 0 | 1 |  |
| 103 | 1 | 0 | 0 | 1 | 0 | 0 | 1 |  |
| 104 | 1 | 0 | 0 | 0 | 1 | 0 | 1 |  |
| 105 | 1 | 0 | 0 | 0 | 0 | 1 | 1 |  |
| 106 | 1 | 1 | 1 | 0 | 0 | 0 | 0 |  |
| 107 | 1 | 1 | 0 | 1 | 0 | 0 | 0 |  |
| 108 | 1 | 1 | 0 | 0 | 1 | 0 | 0 |  |
| 109 | 1 | 1 | 0 | 0 | 0 | 1 | 0 |  |
| 110 | 1 | 0 | 1 | 1 | 0 | 0 | 0 |  |
| 111 | 1 | 0 | 1 | 0 | 1 | 0 | 0 | VOR |
| 112 | 1 | 0 | 1 | 0 | 0 | 1 | 0 |  |
| 113 | 1 | 0 | 0 | 1 | 1 | 0 | 0 |  |
| 114 | 1 | 0 | 0 | 1 | 0 | 1 | 0 |  |
| 115 | 1 | 0 | 0 | 0 | 1 | 1 | 0 |  |
| 116 | 1 | 1 | 1 | 1 | 0 | 0 | 1 |  |
| 117 | 1 | 1 | 1 | 0 | 1 | 0 | 1 |  |
| 118 | 1 | 1 | 1 | 0 | 0 | 1 | 1 |  |
| 119 | 1 | 1 | 0 | 1 | 1 | 0 | 1 |  |
| 120 | 1 | 1 | 0 | 1 | 0 | 1 | 1 |  |
| 121 | 1 | 1 | 0 | 0 | 1 | 1 | 1 |  |
| 122 | 1 | 0 | 1 | 1 | 1 | 0 | 1 |  |
| 123 | 1 | 0 | 1 | 1 | 0 | 1 | 1 |  |
| 124 | 1 | 0 | 1 | 0 | 1 | 1 | 1 |  |
| 125 | 1 | 0 | 0 | 1 | 1 | 1 | 1 | dsp, DSP |
| 126 | 1 | 1 | 1 | 1 | 1 | 0 | 0 |  |
| 127 | 1 | 1 | 1 | 1 | 0 | 1 | 0 | DAP |
| 128 | 1 | 1 | 1 | 0 | 1 | 1 | 0 |  |
| 129 | 1 | 1 | 0 | 1 | 1 | 1 | 0 |  |
| 130 | 1 | 0 | 1 | 1 | 1 | 1 | 0 |  |
| 131 | 1 | 0 | 0 | 0 | 0 | 0 | 0 |  |

In Table 3, the words are labeled with the reference numbers 101 to 131. Each of these words has seven bits labeled I to VII. Without exception, the value 1 is allocated to the bit I. The bits II to VI are coded words of the CCITT Code No. 2. The bit VII identifies the parity of the preceding bits I to VI, whereby the parity 1 is assigned to an even number of values 1 and the parity 0 to an odd number of values 1. Thus, exactly the inverse parity is allocated to the bits I to VI of the words 101 to 103 like the bits allocated according to Table 1 over the outputs h to m of the characters A, B, C. In the practical example described above, the feed information VOR is assigned to the word 111, the continuous stop signal DSP is assigned to the word 125, and the continuous start signal DAP is assigned to the word 127. As explained above, said words 111, 125, 126 are characterized by the fact that they have a Hamming distance of four. Other combinations of such words would also be possible, for example, the words 101, 111 and 125 could be assigned to the signals: continuous stop signal DSP, continuous start signal DAP and feed information VOR. These combinations, too, are distinguished by a signal distance of four.

Figure 3:
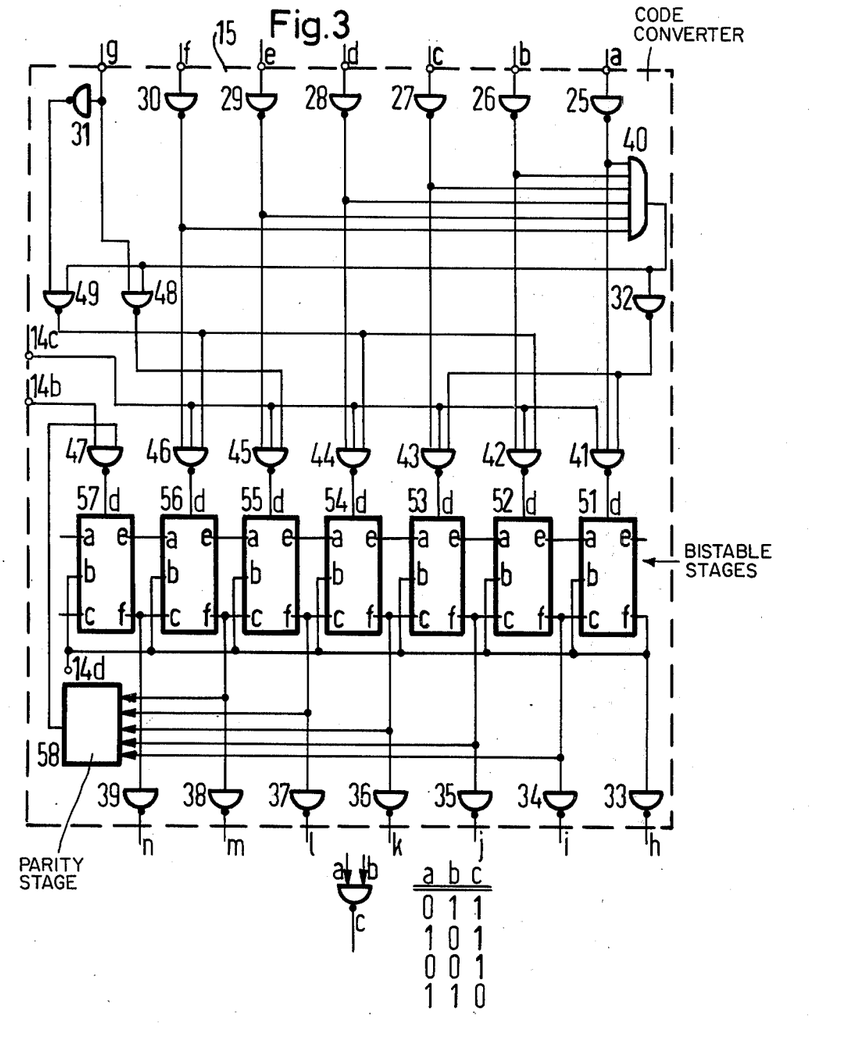
FIG. 3 is a schematic diagram of a code converter to be arranged at the transmitter in the FIG. 1 embodiment.

FIG. 3 shows in greater detail the code converter 15 shown schematically in FIG. 1. It comprises NOT gates 25 to 39, AND gate 40, the NAND gates 41 to 49, bistable switching stages 51 to 57 and parity stage 58. The signals applied to the inputs a to f of the four code converter 15 are output over the gates 25 to 30 and 41 to 46 to the bistable stages 51 to 56 parallel to the outputs h to m. The line-to-store transfer of the information to the switching stages of the shift register takes place by means of the signals 14c depicted in FIG. 2. Shortly thereafter, the information must be read out, since the pulses of the signal 14d shown in FIG. 2 are likewise routed as shift pulses to the stages 51 to 57. Since a signal 1 is applied to the input a of the bistable stage 57, all switching stages 57 to 51 — starting with the stage 57 — are gradually shifted to their zero states.

With respect to the mode of operation of the code converter 15, it is first assumed that a CCITT No. 2 code word corresponding to the expressions A to Z and WR, ZL, BU, ZI, ZWR is routed over the inputs a to g. In the case of all these code words a signal 1 is routed to at least one of the inputs b to f so that a signal 0 is transmitted from at least one of the outputs of the gates 26 to 30. Thereafter, a signal 0 is transmitted from the output of the gate 40 and a signal 1 from the output of the gate 32. Since under the specified conditions a signal 1 is applied to the input of the gate 41 which is connected with the gate 32, since a signal 1 is applied to the output of the gate 25, and since the signal 14c is a signal 1, a signal 0 is transmitted from the output of gate 41 which switches the bistable stage 51 to the one condition and transmits a signal 1 over the output f. A value 0 is read out over the output h of the code converter 15, as is apparent from Table 1.

The value 0 at the output of the gate 40 produces values 1 at the gates 48 and 49 so that a signal 1 is applied to each input of the gates 42 to 46. A 1 value of the signal 14c is applied to each further input of gates 42 to 46. The signal at the third input of the gates 42 to 46 is dependent on the signal being applied to the inputs b to f of the code converter 15. If a signal 0 or a signal 1 is applied to one of said inputs, then a signal 1 or a signal 0 is routed to the third inputs of the gates 42 to 46, and from the outputs thereof, a signal 0 or a signal 1 is transmitted to the switching stages 52 to 56. Thus, signals 0 at the inputs b to f of the code converter 15 produce one states of the bistable stages 52 to 56 and signals 0 at the outputs i to m of the code converter 15. Signals 1 at the inputs b to f of the code converter 15 do not change the zero states of the bistable stages 52 to 56 so that signals 0 are transmitted over the outputs f of the bistable stages and signals 1 over the outputs i to m of the code converter 15. The bits routed to the inputs b to f of the code converter 15 are thus relayed without change to the outputs i to m. In the parity stage 58 the parity of the signals transmitted over the outputs f of the bistable stages 52 to 56 is put through over the outputs f of the multivibrators 52 and 56, and in the case of an even or odd number of values 0 a signal 0 or a signal 1 is transmitted over the output n of the code converter 15.

It is now assumed that a continuous start signal DAP is transmitted over the inputs a to g of the code converter 15. In this case, signals 1 are applied to all inputs of the gate 40 so that a signal 1 is also transmitted from the output of the gate 40 to the gates 32, 48, 49. The signal 0 from the output of the gate 32 produces a signal 1 at the output of the gates 41, 43 and does not change the zero states of the bistable stages 51 and 53, so that a signal 1 is transmitted over each of the outputs h j of the code converter 15, as apparent from Table 1. Since signals 1 are applied to each of the two inputs h and j of the code converter 15, as apparent from Table 1. Since signals 1 are applied to each of the two inputs of the gates 49, signals 0 are sent to the gates 42, 44, 46, which transmit signals 1 to the bistable stages 52, 54, 56 over the outputs of these gates, so that signals 1 are applied to each of the outputs i, f and m. Because of the value 0 at the input g of the code converter 15 and the gate 48, all inputs of the gate 45 carry values 1, so that the bistable stage 55 assumes the one state and a signal 0 is transmitted over the output l of the code converter 15. Due to the even number of the values 0 at the outputs f of the bistable stages 52, 53, 54, 56, a signal 0 is transmitted over the output n of the code converter 15. Thus, in the case of the continuous start signal DAP the code word 1, 1, 1, 1, 0, 1, 0 is transmitted over the outputs h to n of the code converter 15, as is apparent from Table 1.

In the case of the feed information VOR, a signal 1 is, likewise, transmitted over the output of the gate 40. Thus, the bistable stage 51 is again switched to its zero state, and a signal 1 is transmitted over the output h of the code converter 15. Since a signal 1 is now routed over the input g of the code converter 15, two values 1 are applied to the gate 48, whereas a value 0 is applied to the gate 49. Under those requisite conditions, a signal 1 is transmitted over each of the outputs f of the switching stages 52, 54 and 56, while a signal 0 is transmitted over each of the outputs f of the switching stages 53 and 55. A signal 1 is likewise transmitted with the signals 1 of the bistable stages 53, 54, 56, by means of the parity stage 58, over the output f of the stage 57, and a signal 0 is transmitted over the output n of the code converter 15, thereby producing at the outputs h to n of the code converter 15 the FEC code word 1, 0, 1, 0, 1, 0, 0, as apparent from Table 1.

If the code word dsp 1001111 is applied to the inputs a to g of the code converter 15 which, as mentioned hereinabove, is used to identify the continuous stop signal DSP, then the bits 00111 routed over the inputs b to f are transmitted without change to the output i to m of the code converter 15, since a signal 0 is transmitted over the output of the gate 40, and signals 1 are transmitted over each of the outputs of the gates 32, 48, 49. The signal 1 at the input a of the code converter 14 and the corresponding signal 0 at the input of the gate 51 produce a signal 1 at the input d of the switching stage 51 so that the multivibrator 51 remains in its zero state and a value 1 is transmitted over the output h of the code converter 15. The values 0 at the outputs f of the multivibrators 54, 55, 56 produce a value 1 at the output n of the code converter 15. Thus, the word 1001111 is transmitted over the outputs h to n of the code converter 15, as likewise apparent from the Table 1.

Figure 4:
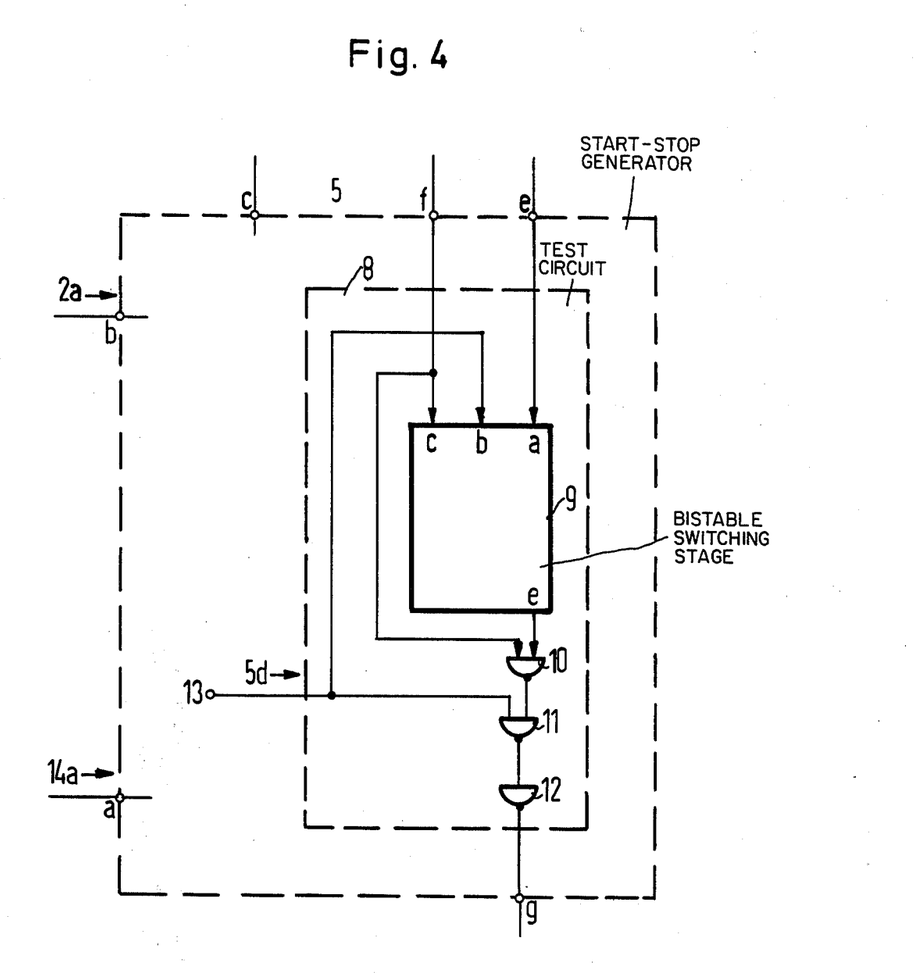
FIG. 4 is a schematic diagram of a test circuit arranged at the transmitter in the FIG. 1 embodiment.

FIG. 4 shows schematically the start-stop generator 5 depicted in FIG. 1 and provided with the test circuit 8. The signals 14a or 2a are routed over the inputs a and b to the start-stop generator 5, and it is connected to the outputs e or f of the bistable stage 4/ST over the inputs e or f. It is deemed old in the art that the start-stop generator 5 generates the signals 5c and 5d shown in FIG. 2 as a function of the signals routed thereto.

The test circuit 8 comprises a bistable switching stage 9, two NAND gates 10 and 11 and a NOT gate 12. The signal 5d is routed over the terminal 13. When a signal 1 is transmitted from the output of gate 10, the pulses of the signal 5d at the output of the gate 11 produce a signal 0, and at the output of the gate 12 a signal 1. In this way, the pulses 5g1, 5g2, or 5g3 are generated in accordance with the pulses 5d1, 5d2 or 5d3 depicted in FIG. 2 and transmitted over the output g of the start-stop generator 5.

If, however, a signal 0 is transmitted from the output of the gate 10, then a signal 0 is transmitted over the output g of the start-stop generator 5 also. In this way, several of the pulses 5d are suppressed if a transition takes place from continuous start signal DAP to continuous stop signal DSP. In the case of the continuous start signal DAP a signal 0 is applied to the input f of the start-stop generator 5, to the inputs c of the bistable switching stage 9, and to an input of the gate 10. A signal 1 is applied to the input of the stage 9, because this input is connected to the output e of the bistable stage 4/ST. Under these prerequisites, the bistable stage 9 is switchable to the zero state with the pulse 5d3 in which condition it transmits a signal 1 over output e. Since the signal 2a assumes the one state from the instant t5, a signal 1 is, likewise, applied to input c of the bistable stage 9 and to the corresponding input of the gate 10, and a signal 0 is transmitted from the output of the gate 10 to the gate 11. Thus, no pulse corresponding to the pulse 5de is transmitted over the output g. Shortly thereafter, the bistable stage 9 is switched to the one state through the pulse 5d4, in which state it transmits a signal over the output e. This creates, again, the requisite conditions that pulses like the pulses 5d1, 5d2 and 5d3 produce corresponding pulses 5g1, 5g2 and 5g3.

Figure 5:
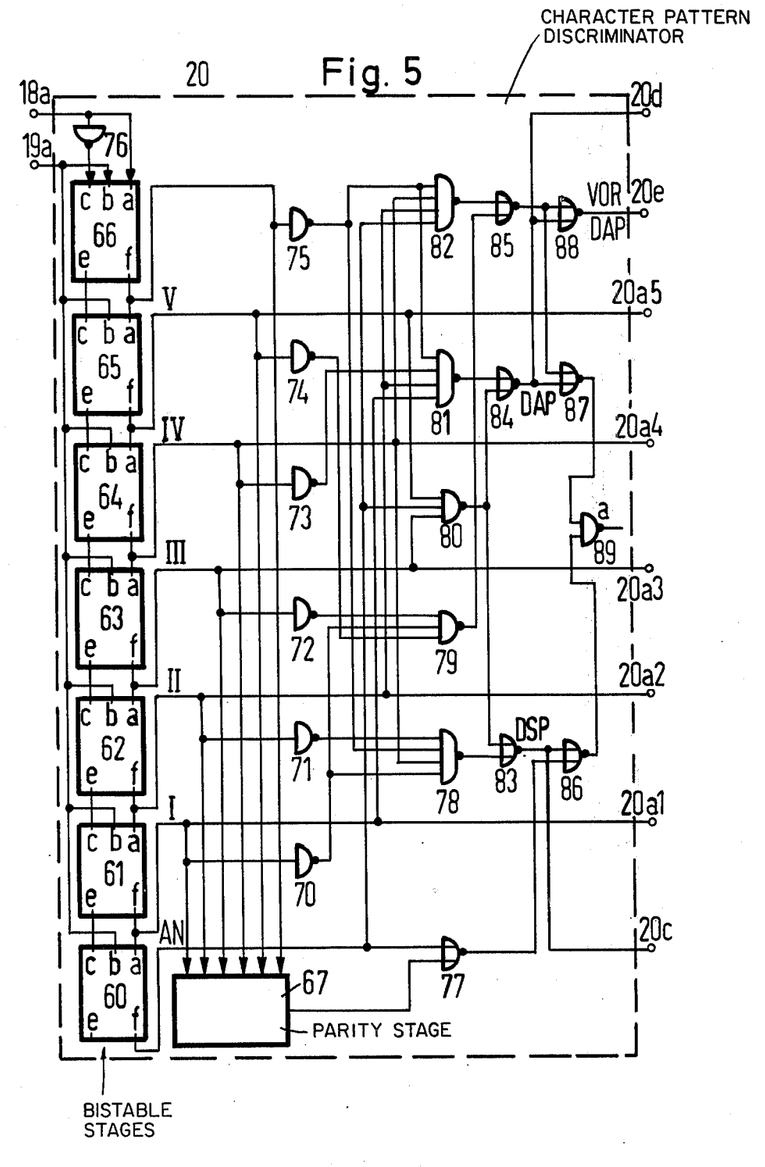
FIG. 5 is a schematic diagram of a character pattern discriminator arranged at the receiver of the FIG. 1 embodiment.

FIG. 5 shows in greater detail the character frame discriminator 20 shown in FIG. 1. It comprises bistable switching stages 60 to 66, parity stage 67, NOT gates 70 to 76, and NAND gates 77 to 89. The character pattern discriminator 20 checks whether one of the code combinations is present, as indicated in Table 1 under the outputs h to n. The code combinations are accepted into the shift register with the bistable stages 60 to 66 over the outputs 18a and 18b. The bistable stage 60 corresponds to the start signal AN, the stages 61 to 65 correspond one after the other to the bits I–V, and the stage 66 is assigned to the last bit of the code word. If one of the characters A to Z or one of the actuating signals WR, ZL, BU, ZI, ZWR is present, then a signal 0 is transmitted over the output e of the stage 60 and if the parity is correct, a signal 0 is likewise transmitted from the parity stage 67 to the gate 77, from the output of which a signal 1 is transmitted. This signal 1 thus identifies the presence of one of the characters A to Z and of one of the signals WR, ZL, BU, ZI, ZWR. By means of the gates 78, 80 and 83, it is verified whether there is a code combination corresponding to the continuous stop signal DSP. With the aid of the gates 80, 81 and 84 it is verified if there is a code combination corresponding to the continuous start signal DAP. A signal 1 is transmitted from the output of the gate 88 whenever the continuous start signal DAP or the feed information VOR is present.

Therefore, if there is a code combination listed in Table 1 under the outputs h to n, then a signal is transmitted over the output 89a of the gate 89. With the aid of a prior art circuit arrangement not shown herein it is verified if this signal appears repeatedly, sequentially from the output 89a at a cyclically recurring spot in the character pattern and, if so, an acceptance clock signal is routed over the terminal 20b, shown in FIG. 6, which causes acceptance of the code word stored in the switching stages 60 to 66 into the parallel to serial converter 21.

Figure 6:
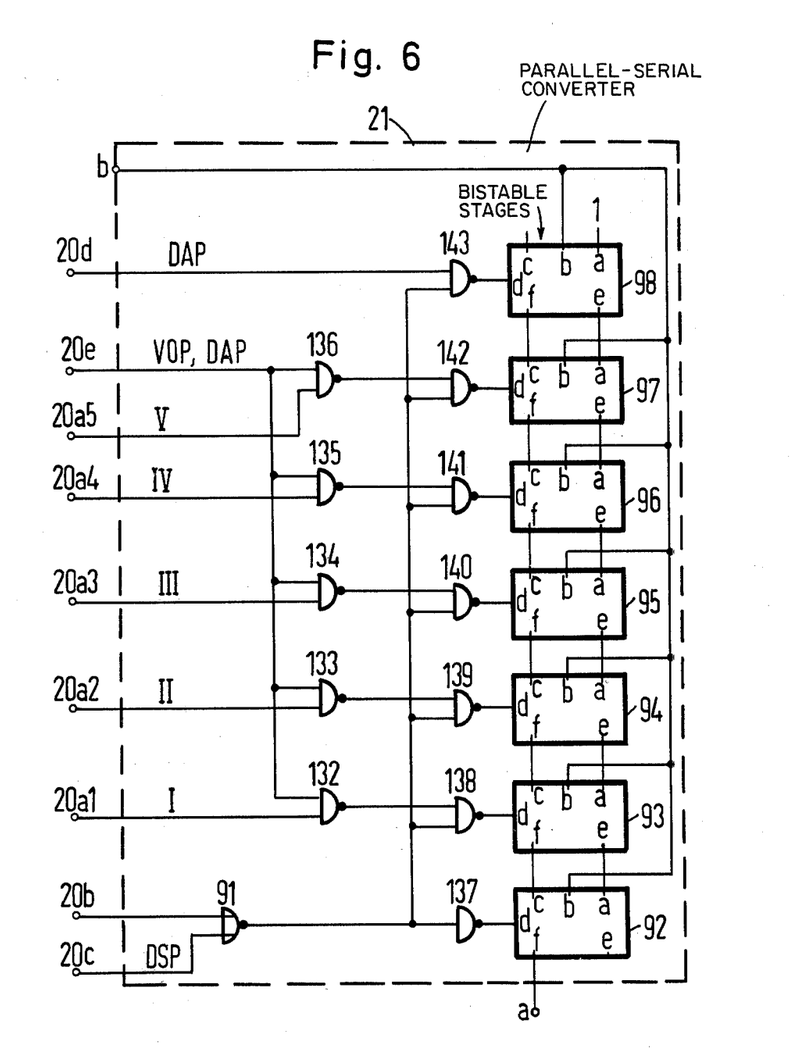
FIG. 6 is a schematic diagram of a code converter arranged at the receiver in the FIG. 1 embodiment.

The parallel to serial converter 21 shown in greater detail in FIG. 6 comprises NAND gates 132 to 143 and bistable switching stages 92 to 98 which, in sequence, are assigned to start signal AN, bits I to V, and stop signal ST. The code words listed in Table 1 under the outputs i to m are coupled in parallel to the converter over inputs 20a1, 20a2, 20a3 and 20a4 and 20a5. The acceptance clock pulse is received therein over input 20b. A signal is supplied over input 20c if the continuous stop signal DSP is transmitted.

A signal is applied over the input 20e which indicates that either the feed information VOR or the continuous start signal DAP is present. Switching pulses are coupled over input b of the converter 21; these pulses are generated with the clock generator 19 depicted in FIG. 1. With the aid of these pulses the information stored in the switching stages 92 to 98 is shifted serially toward output a of the converter 21.

With respect to the mode of operation of the converter 21 it is first assumed that a signal is supplied over the input 20c which indicates that the continuous stop signal DSP is present. In this case, by means of the gates 91 and 137, a signal 0 is applied to the input d of the gate 92 which activates the one state of gate 92. Thus, signals 1 are continually transmitted over the output a of the parallel to serial converter 21 which identify the continuous stop signal DSP.

If words corresponding to the characters of the alphabet A to Z and corresponding to the actuating signals WR, ZL, BU, ZI, ZWR are routed over the inputs 20a1 to 20a5, then these words are accepted in parallel into the bistable stages 93 to 97. Subsequently, the start signal is stored in the bistable stage 92 and the stop signal in the bistable stage 98. Words are then transmitted serially over the output a of the converter 21 corresponding to the letters A to Z and corresponding to the aforementioned actuating signals.

If a signal indicating the continuous start signal DAP is applied to input 20d, then the stage 98 is first switched to its zero condition, because a signal 1 is applied continually to the input a. Subsequently, the other stages 97 to 92 are also switched to their zero conditions so that a sequence of values 0 are transmitted over the output a of the converter 21, which values identify the continuous start signal DAP.

The method of the invention has been described herein in terms of a preferred embodiment for carrying it out. It is to be understood that other forms of apparatus can be used for performing the steps of the method while remaining within the spirit and scope of the invention as defined by the appended claims.

We claim:

1. In a data transmission system wherein unidirectional teletypewriter transmissions occur between a transmitter and receiver, wherein character signals including a start signal, information signals and stop signals are produced in binary code form for transmission, wherein operating conditions signals including a continuous start signal and a continuous stop signal are produced for transmission and wherein a character frame discriminator produces a clock signal for ensuring character frame synchronism between said transmitter and receiver, a method for establishing character frame synchronism during transmission of telegraph signals comprising the steps of:

encoding, firstly, said character signals in said transmitter for producing character code words therefrom said character code words each comprising an initial bit corresponding to said start signal, all of said character code words having initial bits of like polarity, a plurality of bits corresponding to said information signals and a parity bit for establishing the parity of the other bits in said character code word, encoding, secondly, in said transmitter said operating condition signals producing therefrom operating condition signal code words which indicate a character frame, said operating condition code words each comprising a first bit which is inverted relative to said initial bit of said character code words, a number of other bits equalling the number of information signal elements in said character signal and a parity bit for establishing the parity of the preceding bits in said operating condition signal code word, transmitting said operating condition signal code words to said receiver, synchronizing said character frame discriminator with said operating condition signal code words throughout the duration of the character signals and decoding said operating condition signal code words in said receiver.

2. The method defined in claim 1 comprising the additional step of:

forming said character code words and said operating signal code words such that said character code words and operating signal code words are distinguishable from each other.

3. The method defined in claim 1 wherein said first encoding step further comprises producing a said initial bit indicating said start signal of said character signals but which is of inverted polarity relative to said start signal and producing character code words including a plurality of additional bits which indicate the information signals in said character signals but are of inverted polarity relative to the character signals.

* * * * *